Jan. 8, 1929.

S. M. MEYER 1,697,962

HEATING UTENSIL

Filed May 16, 1927

INVENTOR
Svend M. Meyer
BY
Marshall H Hawley
ATTORNEYS

UNITED STATES PATENT OFFICE.

SVEND M. MEYER, OF WOODHAVEN, NEW YORK, ASSIGNOR OF ONE-HALF TO HERMAN L. RINGELMANN, OF MERRICK, NEW YORK.

HEATING UTENSIL.

Application filed May 16, 1927. Serial No. 191,639.

This invention relates to heating tools or utensils, such as soldering irons, sad irons and similar devices.

In order to operate efficiently heating tools or utensils, such as soldering irons or sad irons must have two characteristics, namely, they must be capable of heating up or taking up heat quickly and, furthermore, they must be capable of retaining the heat for a long period of time.

The invention has for its salient object to provide a device of the character specified so constructed and arranged that it will heat up quickly and will retain its heat for a long period of time.

Further objects of the invention will appear from the following specification taken in connection with the drawings, which form a part of this application, and in which Fig. 1 is a longitudinal sectional elevation of one form of utensil constructed in accordance with the invention;

Figure 1:
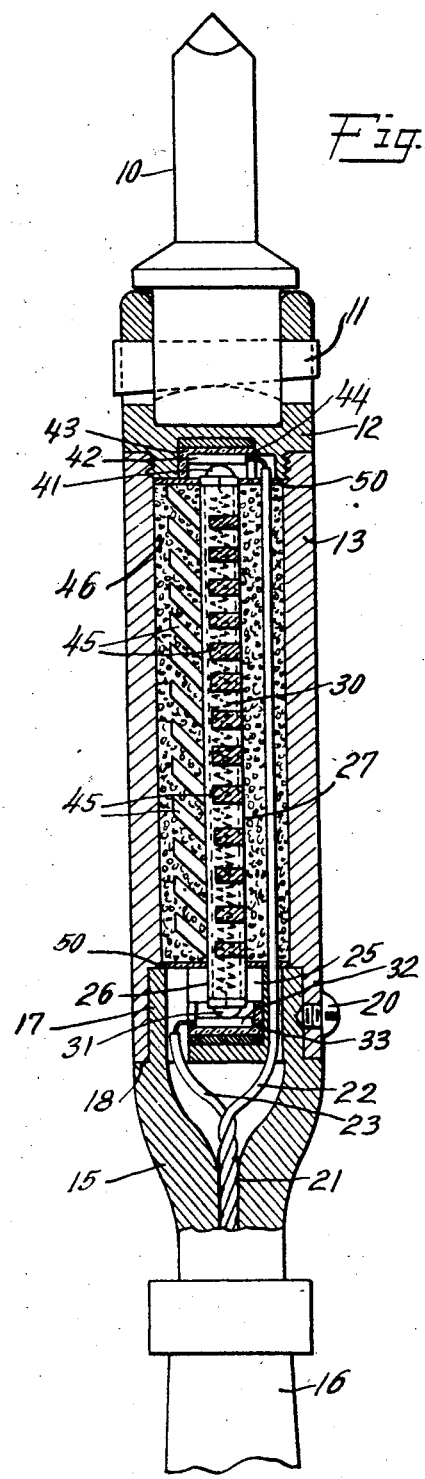
Figure 2:
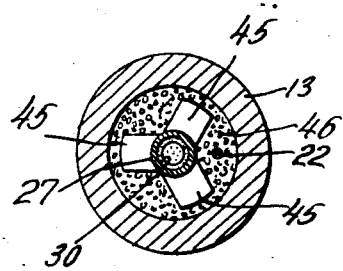
Fig. 2 is a transverse sectional elevation of the device shown in Fig. 1.

The invention briefly described consists of a utensil or tool comprising a shell or casing having mounted therein a metallic core which may be electrically heated by a resistance wire disposed within the core or may be heated by external application of heat to the shell. The core may be formed of any suitable metal, such as copper or phosphor-bronze and a filling of suitable chemical salts is packed around the core and fills the space between the outer shell or casing and the core. This filling may consist of a sulphate or phosphate of certain metals, such as magnesium or aluminum.

The salts are fused in such a manner that the filling is porous and after the fusing of the salts, the casing is sealed up when hot so that a partial vacuum will be created in the casing and in the porous salt filling.

Further details as to the construction and operation of the device will appear from the following description.

In the particular embodiment of the invention illustrated, a soldering tool or iron is shown. It should be understood that the invention is not limited to this particular type of heating tool or utensil but is equally applicable to other heating tools, such as sad irons and similar heating devices.

Soldering irons as is well known are usually provided with copper tips since copper bodies have the advantage of combining a high specific heat and conductivity with a moderate degree of resistance to oxidation at low temperatures. However, when copper is heated in a fire or flame, obnoxious fumes are given off and, furthermore, the copper becomes dulled and is rendered less efficient in taking the tinning without which successful soldering is impossible.

In the device illustrated, the copper tip 10 is detachably connected by a wedge 11 to a cap or plug 12 preferably formed of aluminum or a similar light metal. The cap 12 is secured in any suitable manner as by threading to one end of a hollow shell or tube 13, also preferably formed of aluminum.

The other end of the shell 13 is closed by a plug 15 preferably formed of aluminum and having secured thereto a handle 16. The plug 15 has a reduced extension 17 which extends into the shell or sleeve 13 and the shell abuts against a shoulder 18. Any suitable means may be provided for securing the shell to the plug and in the drawings there is shown a set screw 20 extending through the shell and engaging the extension 17. If as illustrated in Fig. 1, the device is to be electrically heated, the plug 15 is provided with a central opening or bore 21 for receiving the wires 22 and 23.

Figure 3:
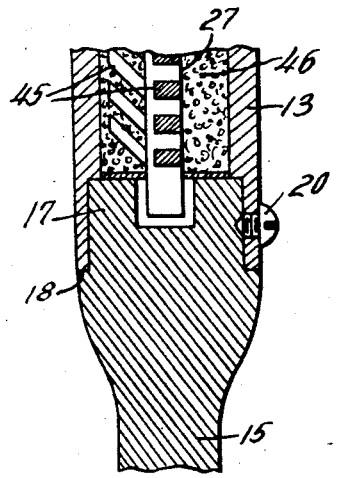
Fig. 3 is a sectional elevation broken away showing another form of the device.

The plug 17 is also recessed as shown at 25 to receive one end 26 of a metallic sleeve 27 which forms the core of the device. The sleeve is preferably formed of copper or phosphor-bronze or some similar metal of high conductivity. If the device is not electrically heated, the sleeve 27 may take the form of a solid rod or may have a solid core enclosed therein. Such a core is shown in Fig. 3.

In Fig. 1, a high resistance heating wire 30 is mounted in the sleeve 27 and has one end connected to a contact member or button 31 which engages a contact plate 32 mounted in a cap or receptacle 33 formed of suitable insulating material. The caps 33 seat against compressible washers or disks 35 of suitable insulating material to allow for expansion of the core. The wire 23 is connected to the contact plate 32.

The other wire 22 extends longitudinally through the inside of the casing and is connected to a contact plate 42 mounted in a cap or receptacle 43 formed of suitable insulating material and disposed in a recess 44 formed in the cap 12. The other end of the resistance wire 30 is connected to a contact member or button 41 which engages the plate 42.

The sleeve 27 preferably has formed thereon or secured thereto a plurality of sets of laterally extending vanes 45, the vanes as shown in Fig. 1 being inclined toward the end of the utensil to be heated or in this case to the end having the copper tip 10 secured thereto.

The core or sleeve 27 and the vanes 45 are embedded in a filling or packing 46 of suitable chemical salts. This is accomplished in the following manner. Before the cap 12 is secured to the outer end of the shell or casing 13, the salts, such as phosphates or sulphates of magnesium or aluminum are packed tightly around the central core completely filling the space between the core and the vanes and the inner wall of the shell 13. Also, finely divided metallic magnesium is mixed with the salts and is packed around the core with the filling of salts. Heat is then applied by the electric resistance wire 30 and also if desired, externally to the shell 13 and this heat causes the magnesium to ignite and burn and causes the salts to fuse. The burning of the magnesium will cause the formation of pores in the fused salts. While the shell, core and salts are still hot, the cap 12 is forced under pressure either by screwing or if desired, by a straight pressure into the shell 13, thus compressing the filling in the shell. When the heated elements and salts cool, a partial vacuum is created within the shell, suitable packing 50 being provided at the two ends of the filling.

*Operation.*

The heating action of the utensil takes place in the following manner. When heat is applied to the utensil either externally or internally, the core which consists of the sleeve 27 and the vanes 45 will be hot and give off fumes which pass into the pores in the filling of salts and cause the salts which have been fused to become heated. The heat radiated from the core will also pass into the filling of salts.

The salts when heated tend to expand but since they are closely confined within the shell 13, this expansion is resisted and heat is thus generated. The heat generated in this manner is added to the heat generated by the resistance heating wire or by the externally applied heat and thus the utensil is brought to the proper temperature very rapidly. The inclination of the vanes 45 toward the portion of the device to be heated or in this instance, toward the copper tip, also tends to conduct the heat in the proper direction.

The rapidity of heating is also facilitated by reason of the partial vacuum in the shell since the fume from the metallic core will pass more rapidly into the salts and any insulation due to air pockets is avoided. Furthermore, it will be evident that the device will remain hot for a long period of time due to the partial vacuum and to the property of the porous fused salts to retain heat.

As above stated, it should be understood that the invention is not limited to the particular form of tool or utensil illustrated or to the structural details particularly shown and described, but that changes in the construction and in the arrangement of the various cooperating parts may be made without departing from the spirit or scope of the invention, as expressed in the following claims.

What I claim is:

1. A heating utensil comprising a metallic core, a shell surrounding and spaced from the core, and a porous filling of fused metallic salts in a solidified form disposed between and substantially filling the space between the core and said shell.

2. A heating utensil comprising a core formed of metal having the characteristics of phosphor-bronze, a shell spaced from the core and a filling of fused metallic salts having the characteristics of magnesium sulphate disposed in and substantially filling the space between the shell and said core.

3. A heating utensil comprising a core formed of metal having the characteristics of phosphor-bronze, a shell spaced from the core and a porous filling of fused metallic salts having the characteristics of magnesium sulphate disposed in and substantially filling the space between the shell and said core.

4. A heating utensil comprising a metallic core, a shell surrounding and spaced from the core and filling of fused metallic salts disposed between and substantially filling the space between the core and said shell, said core having laterally extending vanes inclined toward the portion of the utensil to be heated.

5. A tool of the character described, a casing, a metallic core within said casing, and a porous filling of metallic salts within the casing and closely confined between the core and casing, and an electric heating element within said core, said casing being sealed to permit formation of a vacuum therein.

6. In a tool of the character described, a casing, a soldering point carried thereby, a a metallic core body in said casing having vanes extending laterally from the core body and inclined in a direction toward said soldering point.

7. In a tool of the character described, a casing, a soldering point carried thereby, a metallic core body in said casing having vanes extending laterally from the core body and inclined in a direction toward said soldering point, and a filling of fused metallic salts disposed in said casing between the core and core vanes and the casing wall.

8. In a tool of the character described, a casing, a soldering point carried thereby, a metallic core body in said casing having vanes extending laterally from the core body and inclined in a direction toward said soldering point, and a porous filling of fused metallic salts disposed in said casing between the core and core vanes and the casing wall.

9. In a tool of the character described, a casing, a soldering point carried thereby, a metallic core body in said casing having vanes extending laterally from the core body and inclined in a direction toward said soldering point, and a porous filling of fused metallic salts disposed in said casing between the core and core vanes and the casing wall, the pores of the filling being under a partial vacuum.

10. A heating utensil comprising a metallic core, a shell surrounding and spaced from the core, a porous filling of fused metallic salts expansible when heated disposed between and substantially filling the space between the core and said shell, and an electric heating element disposed within said core, said casing being sealed to permit formation of a partial vacuum therein.

11. In a tool of the character described, a casing, a soldering point carried thereby, a metallic core body in said casing having vanes extending laterally from the core body and inclined in a direction toward said soldering point, a porous filling of fused metallic salts disposed in said casing between the core and core vanes and the casing wall, and an electric heating element disposed within said core body.

12. In a tool of the character described, a casing, a soldering point carried thereby, a metallic core body in said casing having vanes extending laterally from the core body and inclined in a direction towards said soldering point, and a filling of heat retaining material disposed in said casing between the core body and the core vanes and the casing wall.

13. A heating utensil, comprising a metallic core, a shell surrounding and spaced from the core and having a partial vacuum therein, and a porous filling of fused metallic salts disposed between and substantially filling the space between the core and said shell.

In witness whereof, I have hereunto set my hand this 11th day of May, 1927.

SVEND M. MEYER.